455-296 SR
FIP8106 XR 3,287,645
CROSS REFERENCE SEARCH ROOM

Nov. 22, 1966 E. J. BAGHDADY 3,287,645
WEAK SIGNAL BOOSTER
Filed Jan. 28, 1963

INVENTOR,
ELIE J. BAGHDADY
BY Harry M. Saragovitz
ATTORNEY.

3,287,645
Patented Nov. 22, 1966

3,287,645

WEAK SIGNAL BOOSTER

Elie J. Baghdady, Weston, Mass., assignor to the United States of America as represented by the Secretary of the Army Filed Jan. 28, 1963, Ser. No. 254,527
4 Claims. (Cl. 325—344)

The present invention relates to a method and apparatus for boosting or enhancing the relative amplitude of the weaker of two co-channel signals in a frequency modulated system. More particularly, the invention provides circuitry, for the above-stated purpose, which may be inserted into the IF channel of an FM receiver in which two signals may be present simultaneously in the IF passband thereof, one a stronger undesired signal, which may be a jamming signal, and a weaker signal which it is desired to receive. In the output of the device, the roles of two signals are reversed, the desired one being the stronger. The succeeding detection circuitry of the FM receiver than captures the desired signal, resulting in a further suppression of the undesired, originally stronger signal.

Briefly stated, the invention provides circuitry for dividing the intermediate frequency signal into two channels. The first channel contains a beat frequency detector, the output of which is connected to one input of a balanced modulator, the other input of which is the intermediate frequency signal. The second channel includes a square law device which feeds one input of a second balanced modulator, the second input of which is the intermediate frequency signal. The output of the second balanced modulator is then passed through a bandpass filter. The output of the filter and the output of the first balanced modulator are then applied to an adder circuit, the output of which contains the desired signal at sufficient amplitude relative to the undesired one to enable it to be captured by the succeeding FM limiter and detector.

The circuitry and mode of operation of the invention will be better understood with reference to the following detailed description and drawings, in which FIG. 1 is a block diagram of one embodiment of the novel circuitry of the present invention.

Figure 1:
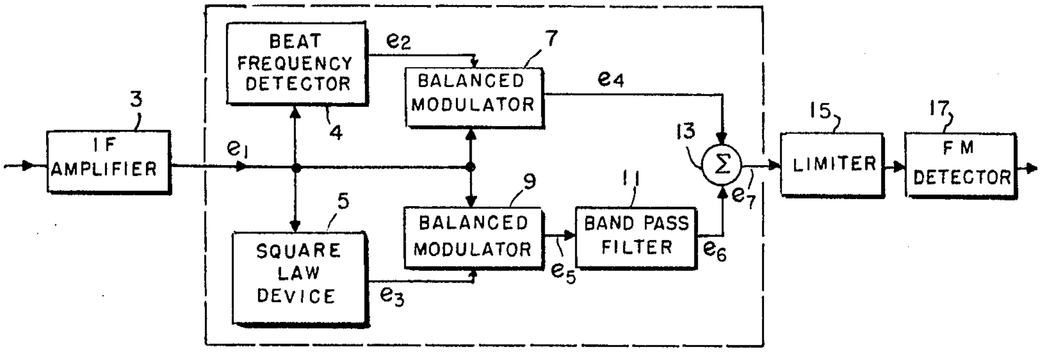

FIG. 1 illustrates how the invention, shown within the dashed outline, may be inserted in the IF channel of a conventional FM receiver between IF amplifier 3 and limiter 15. The output $e_1$, of conventional IF amplifier 3 may be expressed as:

$$\begin{aligned} e_1 &= E_s e^{jpt}(1+ae^{jrt}) \\ &= E_s(e^{jpt}+ae^{j(p+r)t}) \qquad (1) \end{aligned}$$

in which $p$ is the frequency of the stronger undesired signal, $p+r$ is the frequency of the weaker desired signal and $a$ is the ratio of the amplitudes of the weaker to the stronger signal. The two co-channel signals represented by $e_1$ are applied to a beat frequency detector 4 which heterodynes the two signals together and yields the difference or beat frequency $r$ therebetween. The beat frequency detector 4 may comprise, for example, a non-linear or unidirectional conducting device followed by a low pass filter with a cutoff frequency approximately equal to the IF bandwidth. This filter will therefore suppress the original two carrier frequencies but will pass the beat frequency between them. The output of element 4, $e_2$, may be expressed as:

$$\begin{aligned} e_2 &= aE_s(e^{jrt}+e^{-jrt}) \\ &= 2aE \cos rt \qquad (2) \end{aligned}$$

The output of beat frequency detector 4 and the output of IF amplifier 3 are applied to balanced modulator 7. In balanced modulator 7, the two carrier frequencies $p$ and $p+r$ which comprise input signal $e_1$ are modulated by the difference frequency $r$, which comprises the other input $e_2$. As is well known, the output of a balanced modulator comprises the product of its inputs or the sum and difference frequencies of the input frequencies with the carrier suppressed. In this case there are two carriers, therefore the output of balanced modulator 7, $e_4$, will contain four sideband frequencies. The output of 7 may be expressed as follows:

$$\begin{aligned} e_4 = E_s[&a \cos (p+r)t + a \cos (p-r)t \\ &+ a^2 \cos [(p+r)+r]t + a^2 \cos [(p+r)-r]t] \end{aligned}$$

or, substituting $E_4$ for $aE_s$, this may be rewritten as:

$$e_4 = E_4[\cos (p+r)t + \cos (p-r)t + a \cos (p+2r)t + a \cos pt] \qquad (3)$$

The output of IF amplifier 3 is also applied to square law device 5 which produces an output $e_3$, which is the mathematical square of its input. An example of such a device is the well-known frequency doubler, which may comprise a non-linear amplifier followed by a bandpass filter tuned to a band of frequencies centered at double the intermediate frequency. The output of square law device 5 may be expressed as;

$$\begin{aligned} e_3 &= (e_1)^2 = [E_s e^{jpt}(1+ae^{jrt})]^2 \\ &= E_s^2 e^{j2pt}[1+2ae^{jrt}+a^2e^{j2rt}] \\ &= bE_s^2[e^{j2pt}+2ae^{j(2p+r)t}+a^2e^{j(2p+2r)t}] \\ &= bE_s^2[\cos 2pt + 2a \cos (2p+r)t + a^2 \cos (2p+2r)t] \qquad (4) \end{aligned}$$

wherein $b$ is a scale factor.

The output of square law device 5, $e_3$, and $e_1$ are applied to balanced modulator 9, the output of which will be the product of these complex inputs. The output of 9, $e_5$, may be expressed as;

$$\begin{aligned} e_5 &= e_1 \times e_3 \\ &= E_s[\cos pt + a \cos (p+r)t] \times bE_s^2[\cos 2pt + 2a \cos (2p+r)t + a^2 \cos (2p+2r)t] \\ &= bE_s^3[\cos 3pt + \cos pt + 2a \cos (p+r)t \\ &\quad + 2a \cos (3p+r)t + a^2 \cos (p+2r)t + a^2 \cos (3p+2r)t \\ &\quad + a \cos (3p+r)t + a \cos (p-r)t + 2a^2 \cos (3p+2r)t \\ &\quad + 2a^2 \cos pt + a^3 \cos (p+r)t + a^3 \cos (3p+3r)t] \qquad (5) \end{aligned}$$

The output of balanced modulator 9 is passed through bandpass filter 11 which is tuned to a center frequency approximately equal to the intermediate frequency of the receiver and of the same bandwidth. This filter eliminates components of $e_5$ and yields an output $e_6$ as follows;

$$\begin{aligned} e_6 = bE_s^3[&\cos pt + 2a \cos (p+r)t + a^2 \cos (p+2r)t \\ &+ a \cos (p-r)t + 2a^2 \cos pt + a^3 \cos (p+r)t] \end{aligned}$$

which may be rewritten as;

$$\begin{aligned} e_6 = E_6[&1+2a^2) \cos pt + (2a+a^3) \cos (p+r)t \\ &+ a^2 \cos (p+2r)t + a \cos (p-r)t] \qquad (5a) \end{aligned}$$

wherein $E_6 = bE_s^3$

The two signals $e_4$ and $e_6$ are then applied to adder circuit 13 which yields the sum of its two complex inputs. The output of 13 can be expressed as;

$$e_7 = e_4 + e_6 \qquad (6)$$

Adding Equations 3 and 5 and collecting terms yields;

$$\begin{aligned} e_7/E_6 = &(1+2a^2+ak) \cos pt + (2a+a^3+k) \cos (p+r)t \\ &+ (a^2+ak) \cos (p+2r)t + (a+k) \cos (p-r)t \qquad (7) \end{aligned}$$

wherein $k$ is defined as $E_4/E_6$.

Equation 7 may be expressed as, $$\frac{e_7}{E_6(2a+a^3+k)}=\cos(p+r)t+C_{-1}\cos pt$$
$$+C_1\cos(p+2r)t+C_{-2}\cos(p-r)t \quad (8)$$

wherein:

$$C_{-1}=\frac{1+2a^2+ak}{2a+a^3+k} \quad (9)$$

$$C_1=\frac{a^2+ak}{2a+a^3+k}$$

$$C_{-2}=\frac{a+k}{2a+a^3+k} \quad (10)$$

Figure 2:
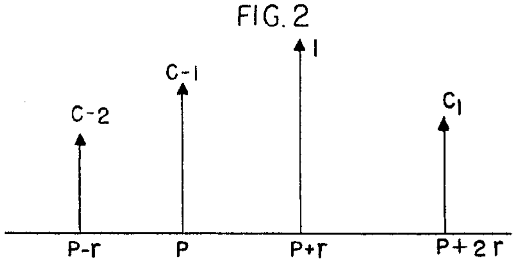
FIG. 2 illustrates the frequency spectrum in the output of the device.

FIG. 2 shows the frequency spectrum of Equation 8 as it appears in the output of adder circuit 13.

Figure 3:
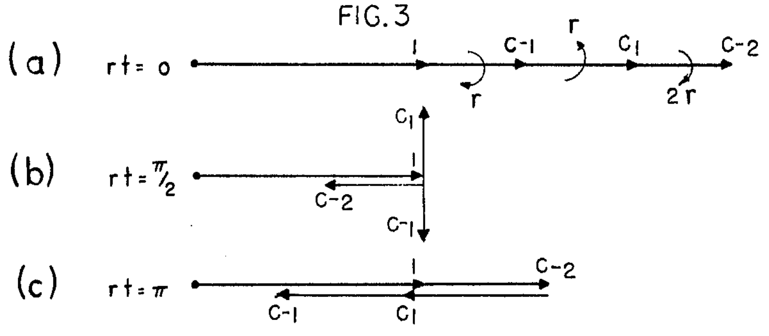
FIG. 3 is a vector diagram of the output at three points of time.

FIG. 3 illustrates the relative phases of four frequency components of Equation 8 at three points in time, namely at $rt=0$, $rt=\pi/2$, and $rt=\pi$. In this figure the phasor 1, which represents the desired signal at frequency $p+r$ has been taken as a reference to which the rotation of the other components are referred. Referring to FIG. 3*a*, the phasor $C_{-1}$ is shown as rotating clockwise at frequency $r$ relative to phasor 1, since the $C_{-1}$ component is lower in frequency than the $p+r$ component by $r$ radians per second. The $C_1$ component, being $r$ radians per second above the $p+r$ component is shown as rotating counter-clockwise relative to phasor 1. Similarly, the $C_{-2}$ component rotates clockwise at frequency $2r$. In order for the desired signal of frequency $p+r$ to predominate in the output of adder 13, the average frequency of the four phasors of FIG. 3 must equal $p+r$ radians per second over one period of the frequency difference $r$. This condition will obtain if the sum of the $C_{-1}$, $C_1$ and $C_{-2}$ components in phase opposition to the desired phasor of frequency $p+r$, is never greater than 1. Under these conditions there will be no abrupt phase reversals in the output of adder 13 and the average frequency thereof will be $p+r$. In FIG. 3*a*, the four phasors are shown as all in phase at $rt=0$. In FIG. 3*b* the relative positions of the four phasors are shown at $rt=\pi/2$ or 90° later in terms of the difference frequency $r$. The $C_{-1}$ phasor has rotated 90° clockwise, the $C_1$ phasor 90° counterclockwise and the $C_{-2}$ phasor 180° clockwise, since it rotates at frequency $2r$ relative to the reference phasor. It can be seen from FIG. 3*b* that $C_{-2}$ must be less than 1 in order for the resultant signal to have the desired frequency. This condition can be mathematically expressed as follows:

$$C_{-2}=\frac{a+k}{2a+a^3+k}<1 \quad (12)$$

Since $a$, being the ratio of the amplitude of the weaker to the stronger signal, is always between 0 and 1, it is evident that $C_{-2}$ will be less than 1 for all finite values of K.

FIG. 3*c* shows the phasors at $rt=\pi$ or 180° later. From this diagram it can be seen that the sum of $C_1$ and $C_{-1}$, minus $C_{-2}$, must be less than 1 in order for the desired condition to obtain. This condtiion can be expressed as follows:

$$\frac{C_1+C_{-1}}{1+C_{-2}}<1 \quad (13)$$

Substituting the definations of $C_1$, $C_{-1}$ and $C_{-2}$ from Equations 9, 10, 11 in 13 yields, $$\frac{1+3a^3+2aK}{3a+a^3+2K}<1 \quad (14)$$

Figure 4:
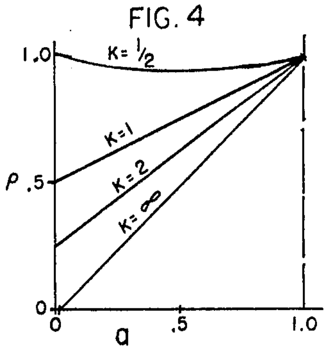
FIG. 4 is a group of curves useful in explaining the operation of the device.

FIG. 4 shows the behavior of the left side of Equation 14, which has been denominated $\rho$, as a function of $a$ and K. It is evident therefrom that $\rho$ will be less than 1 for $a$ in the range $0<a<1$ provided that $K\geqq 1/2$.

Therefore, it may be seen that for all values of $K=E_4/E_6\geqq 1/2$, the average frequency of the resultant signal at the output of adder 13 will be equal to the frequency of the desired weaker of the two input signals. It should be noted that this result is independent of whether the weaker signal is above the stronger signal or below it in frequency, i.e., the algebraic sign of $r$ is immaterial. Since K is the ratio of signal levels at the outputs of elements 7 and 11, its value is determined by the relative amounts of gain in the circuit elements 4 and 7 compared to the gain in the elements 5, 9 and 11, and the gains thereof must be chosen to yield the required ratio K.

From added 13, the signal is fed to conventional FM limiter 15 and thence to frequency detector 17. The desired signal at frequency $p+r$, now being larger than the other components in the limiter input it will be "captured" thereby, resulting in a further enhancement of the desired signal.

Thus the present invention provides a relatively simple arrangement of well-known circuit elements by means of which a conventional FM receiver may be converted into an anti-jamming receiver. While a specific embodiment of the invention has been shown and described, it is obvious that many modifications may be made therein by those skilled in the art. Accordingly, the invention should be limited only by the scope of the appended claims.

What is claimed is:

1. A weak signal booster for insertion between an intermediate frequency amplifier and a limiter in a frequency modulated receiver, comprising; a beat frequency detector and a square law device, the inputs of which are connected to the output of said intermediate frequency amplifier, the output of said beat frequency detector being connected to one input of a first balanced modulator, the output of said square law device being connected to one input of a second balanced modulator, the second input of each of said balanced modulators being connected to the output of said intermediate frequency amplifier, the output of said first balanced modulator being connected to one input of an adder circuit, the output of said second balanced modulator being applied to a bandpass filter tuned to a center frequency approximately equal to said intermediate frequency and of the same bandwidth thereof, the output of said bandpass filter being connected to another input of said adder circuit, the output of said adder circuit being connected to the input of said limiter.

2. A circuit adapted to be inserted between an intermediate frequency amplifier and a limiter of a frequency modulated receiver for the purpose of boosting the weaker of two co-channel signals therein, comprising; a beat frequency detector and a square law device, the inputs of which are connected to the output of said intermediate frequency amplifier, first and second balanced modulators, one input of each of which is connected to the output of said intermediate frequency amplifier, the output of said beat frequency detector being connected to the second input of said first balanced modulator, the output of said square law device being connected to the second input of said second balanced modulator, the output of said second balanced modulator being connected to a bandpass filter and thence to one input of an adder circuit, the output of said first balanced modulator being connected to a second input of said adder circuit, the output of said adder circuit being connected to the input of said limiter, the constants of said circuit elements being chosen such that the average frequency of the output of said adder circuit equals the frequency of the weaker of the two original co-channel signals over one cycle of the difference frequency between said co-channel signals.

3. A circuit for enhancing the weaker of two co-channel signals comprising, means to extract the beat or difference frequency between said co-channel signals, means to multiply said difference frequency and said two co-channel signals in a first balanced modulator, means to square said two co-channel signals and means to multiply said squared signal and said two co-channel signals in a second balanced modulator, means to select the components in the output of said second balanced modulator at the frequency of the two original co-channel signals, and also those components above and below the frequencies of said two signal co-channel signals by the amount of said difference frequency, and means to add the outputs of said first balanced modulator and the selected components in the output of said second balanced modulator.

4. A weak signal booster for insertion between an intermediate frequency amplifier and a limiter in a frequency modulated receiver, comprising; a beat frequency detector and a square law device, the inputs of which are connected to the output of said intermediate frequency amplifier, the output of said beat frequency detector being connected to one input of a first balanced modulator, the output of said square law device being connected to one input of a second balanced modulator, the second input of each of said balanced modulators being connected to the output of said intermediate frequency amplifier, the output of said first balanced modulator being connected to one input of an adder circuit, the output of said second balanced modulator being applied to a bandpass filter tuned to a center frequency approximately equal to said intermediate frequency and of the same bandwidth thereof, the output of said bandpass filter being connected to another input of said adder circuit, the output of said adder circuit being connected to the input of said limiter, the constants of said circuit elements being chosen such that the ratio of the amplitude of the output of said first balanced modulator to the amplitude of the output of said bandpass filter is equal to or greater than one half.

References Cited by the Examiner

UNITED STATES PATENTS 3,092,776 6/1963 Castellini ---------- 325—474

KATHLEEN H. CLAFFY, *Primary Examiner.*

R. S. BELL, *Assistant Examiner.*